United States Patent
Kim (10) Patent No.: US 10,665,851 B2
(45) Date of Patent: May 26, 2020

(54) CAP ASSEMBLY AND SECONDARY BATTERY INCLUDING THE SAME

(71) Applicant: Samsung SDI Co., Ltd., Yongin-si, Gyeonggi-do (KR)

(72) Inventor: Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 270 days.

(21) Appl. No.: 15/389,184

(22) Filed: Dec. 22, 2016

(65) Prior Publication Data

US 2017/0194619 A1    Jul. 6, 2017

(30) Foreign Application Priority Data

Jan. 4, 2016    (KR) .................... 10-2016-0000515

(51) Int. Cl.
*H01M 2/34*    (2006.01)
*H01M 2/04*    (2006.01)
*H01M 2/22*    (2006.01)
*H01M 2/12*    (2006.01)

(52) U.S. Cl.
CPC ........... *H01M 2/345* (2013.01); *H01M 2/046* (2013.01); *H01M 2/1229* (2013.01); *H01M 2/1241* (2013.01); *H01M 2/22* (2013.01); *H01M 2200/20* (2013.01)

(58) Field of Classification Search
CPC ..... H01M 2200/20; H01M 2/22; H01M 2/263
See application file for complete search history.

(56) References Cited

U.S. PATENT DOCUMENTS

| 2010/0159288 | A1* | 6/2010 | Kim | ................... H01M 2/0413 |
| | | | | 429/7 |
| 2011/0183172 | A1 | 7/2011 | Unno et al. | |
| 2015/0086847 | A1 | 3/2015 | Minagata | |

FOREIGN PATENT DOCUMENTS

| CN | 201508864 U | 6/2010 |
| EP | 2197064 A1 | 6/2010 |
| EP | 2930764 A1 | 10/2015 |
| KR | 10-2010-0032731 | 3/2010 |
| KR | 10-2013-0034285 | 4/2013 |

OTHER PUBLICATIONS

EPO Extended Search Report dated Apr. 6, 2017, for corresponding European Patent Application No. 16207525.3 (8 pages).
EPO Office Action dated Apr. 4, 2018, for corresponding European Patent Application No. 16207525.3 (5 pages).

* cited by examiner

*Primary Examiner* — Ladan Mohaddes
(74) *Attorney, Agent, or Firm* — Lewis Roca Rothgerber Christie LLP (57) ABSTRACT

A cap assembly of a secondary battery is provided. The cap assembly includes: a cap plate; a current interrupt device (CID) under the cap plate, the CID including: a vent plate under the cap plate, the vent plate including a vent protruding downward and to be deformed when internal pressure of the secondary battery is increased; and a sub-plate under the vent plate and connected to the vent; a middle plate between the vent plate and the sub-plate and electrically connected to the vent plate through the sub-plate, the middle plate having a receiving groove to receive the sub-plate; and an insulator between the vent plate and the middle plate.

20 Claims, 6 Drawing Sheets

CAP ASSEMBLY AND SECONDARY BATTERY INCLUDING THE SAME

CROSS-REFERENCE TO RELATED APPLICATION

This application claims priority to and the benefit of Korean Patent Application No. 10-2016-0000515, filed on Jan. 4, 2016, in the Korean Intellectual Property Office, the disclosure of which is incorporated herein in its entirety by reference.

BACKGROUND

1. Field

One or more example embodiments relate to a cap assembly having a novel structure that may increase output power by reducing a resistance of a battery and/or a secondary battery including the cap assembly.

2. Description of the Related Art

Secondary batteries that may be charged and discharged, and thus, may be repeatedly used, are utilized as energy sources for mobile electronic devices, power tools, garden tools, electric vehicles (EVs), power storage systems, etc., and may be sought for in applications for more various devices.

Power tools, garden tools, EVs, E-bikes, etc., that use secondary batteries may desire to have more output power.

Cylindrical secondary batteries are generally used in the above applications. However, because the cylindrical secondary battery may have a fixed available volume, it may be difficult to increase capacity and output power.

In order to increase output power, a resistance of a battery may be reduced, and to this end, the number of tabs of electrode plates in a limited volume may be increased. However, when the number of tabs is increased, there may be many limits to performing a process of welding the tabs to a current interrupt device (CID) or to a can.

The above information disclosed in this Background section is for enhancement of understanding of the background of the inventice concept, and therefore, it may contain information that does not constitute prior art.

SUMMARY

One or more embodiments provide a cap assembly having a novel structure that may reduce a resistance of a battery and increase output power, and a secondary battery including the cap assembly.

Additional aspects will be set forth in part in the description which follows and, in part, will be apparent from the description, or may be learned by practice of the presented embodiments.

According to one or more embodiments, a cap assembly of a secondary battery includes: a cap plate; a current interrupt device (CID) under the cap plate, the CID including: a vent plate under the cap plate, the vent plate including a vent protruding downward and configured to be deformed when internal pressure of the secondary battery is increased; and a sub-plate under the vent plate and connected to the vent; a middle plate between the vent plate and the sub-plate and electrically connected to the vent plate through the sub-plate, the middle plate having a receiving groove to receive the sub-plate; and an insulator between the vent plate and the middle plate.

The receiving groove may have a concave shape extending upward from a bottom surface of the middle plate.

The middle plate may include a stepped portion extending from the bottom surface of the middle plate to a surface of the receiving groove, and a height of the stepped portion may be equal to or greater than a thickness of the sub-plate.

The sub-plate may contact the surface of the receiving groove.

A height of the receiving groove may be equal to or greater than a thickness of the sub-plate.

Each of the insulator and the middle plate may have a through-hole, and the vent may pass through the through-hole of the insulator and the through-hole of the middle plate, and may be connected to the sub-plate.

The vent may pass through the through-hole of the insulator, the through-hole of the middle plate, and the receiving groove of the middle plate, and may be connected to the sub-plate.

The sub-plate may include a contact portion contacting the vent, and a bottom portion opposite to the contact portion, and at least one of the contact portion and the bottom portion may be in the receiving groove.

An electrode tab extending from an electrode assembly of the secondary battery may be under the sub-plate and the middle plate, and may be connected to at least one of the sub-plate and the middle plate to electrically connect the electrode assembly to the vent plate.

The electrode tab may be connected to both the sub-plate and the middle plate.

The electrode tab may have a multi-tab structure including a plurality of tabs extending from a plurality of portions of the electrode assembly of the secondary battery, and the plurality of tabs may be electrically connected to each other.

According to one or more embodiments, a secondary battery includes the cap assembly.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Hereinafter, example embodiments will be described in more detail with reference to the accompanying drawings.

The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
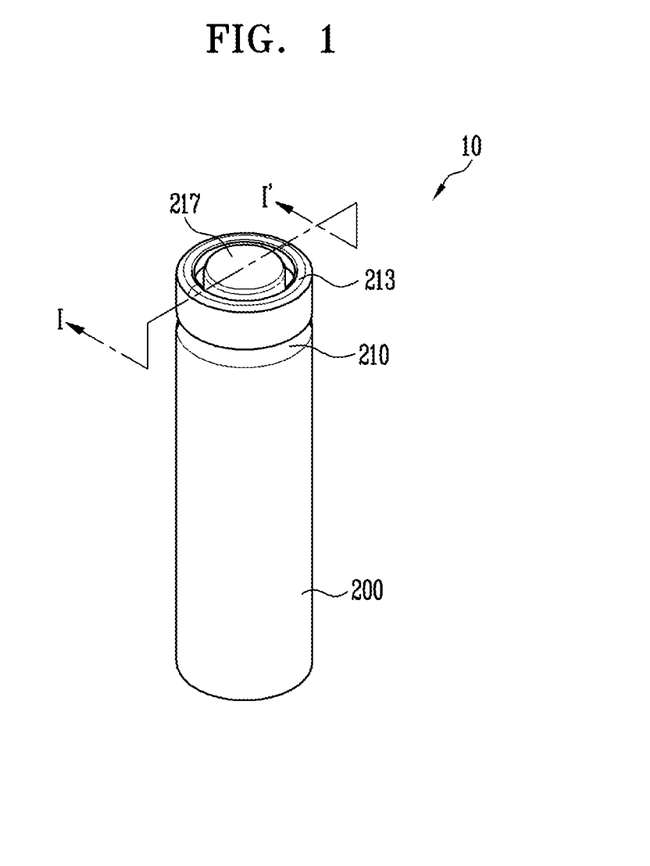
FIG. 1 is a perspective view illustrating an outer appearance of a secondary battery according to an embodiment.
Figure 2:
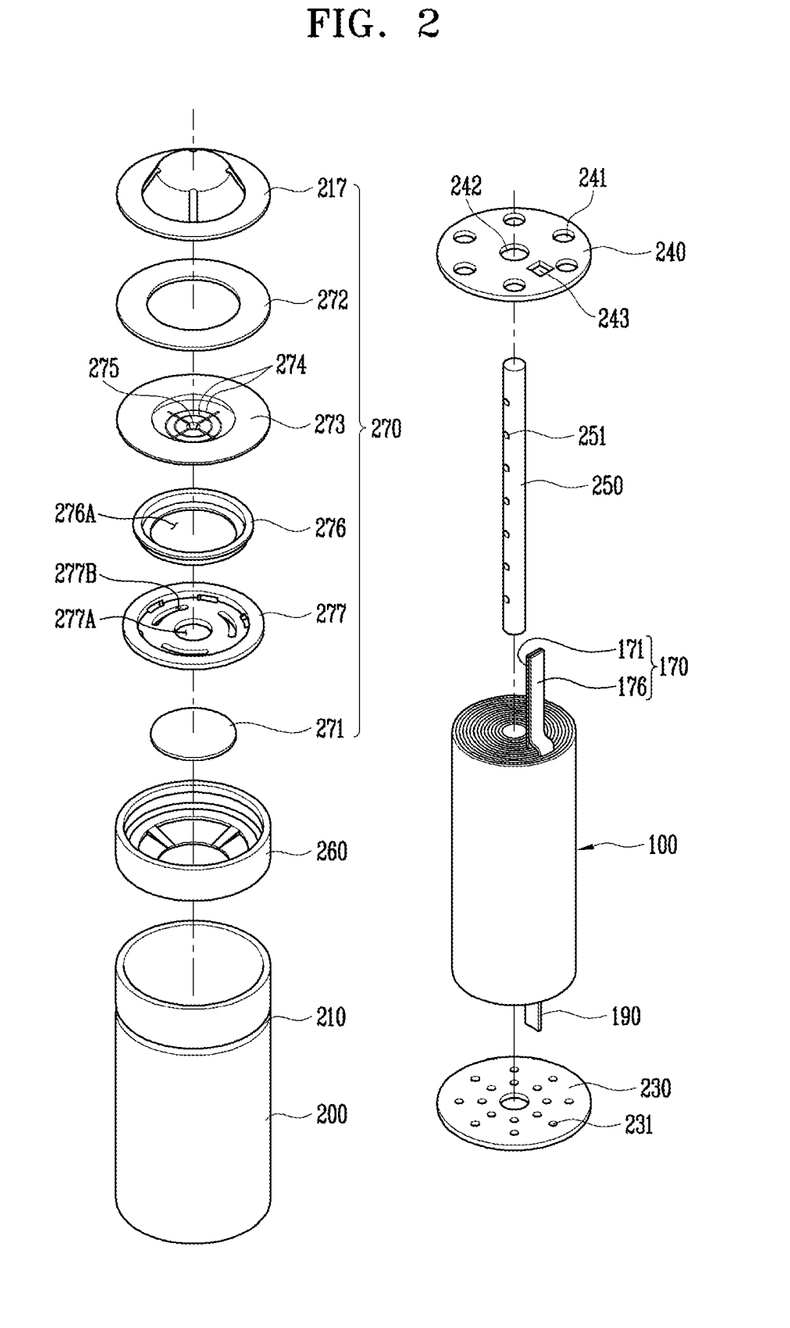
FIG. 2 is an exploded perspective view of FIG. 1.
Figure 3:
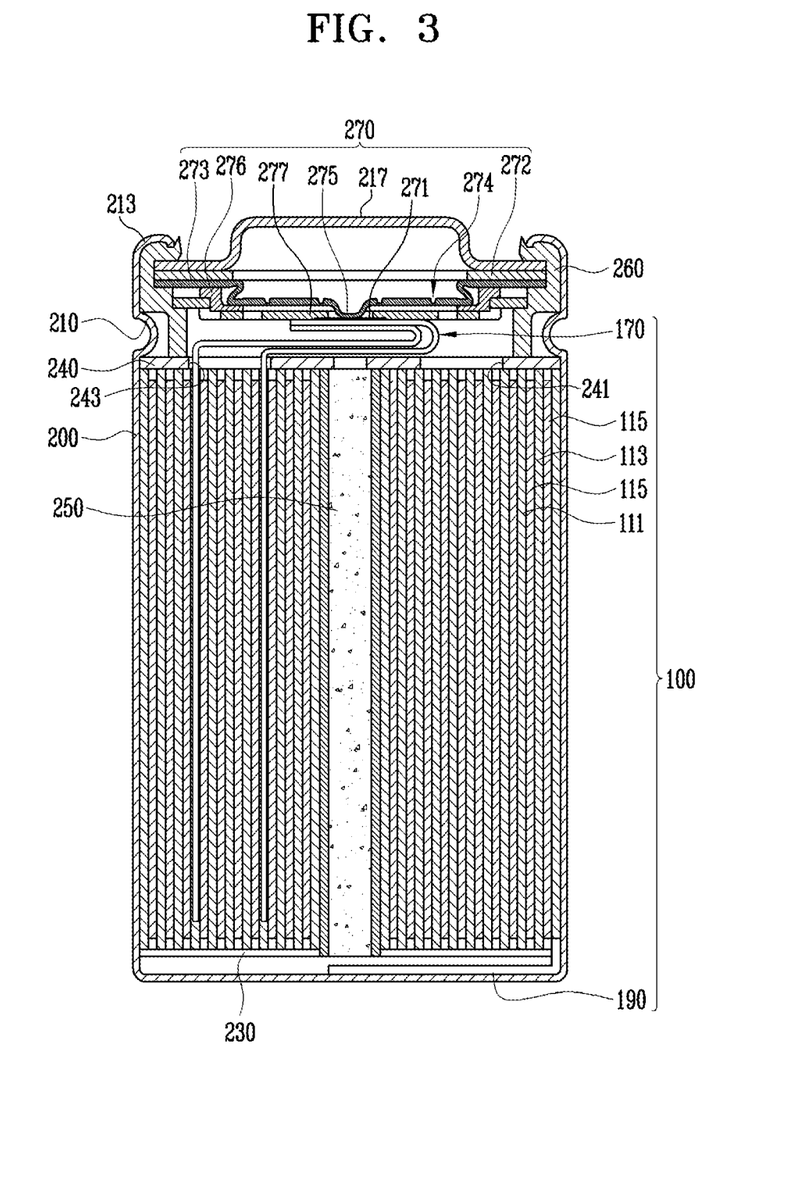
FIG. 3 is a cross-sectional view taken along the line I-I' of FIG. 1.

FIG. 1 is a perspective view illustrating an outer appearance of a secondary battery 10 according to an embodiment. FIG. 2 is an exploded perspective view of FIG. 1. FIG. 3 is a cross-sectional view taken along the line I-I' of FIG. 1.

As shown in FIGS. 1 through 3, the secondary battery 10 according to an embodiment includes an electrode assembly 100, a can 200 in which the electrode assembly 100 is received, a plurality of insulating plates 230 and 240, a center pin 250, a gasket 260, and a cap assembly 270 that seals the can 200 along with the gasket 260.

The electrode assembly 100 includes first and second electrodes 113 and 111, and a separator 115. The separator 115 is located between the first and second electrodes 113 and 111. The first electrode 113 and the second electrode 111 have opposite polarities from each other, and thus, when one of the first electrode 113 and the second electrode 111 is a positive electrode, the other one of the first electrode 113 and the second electrode 111 is a negative electrode. The first electrode 113, the separator 115, and the second electrode 111 are sequentially stacked and then are rolled.

The electrode assembly 100 includes a plurality of first electrode tabs 170 that are electrically connected to the first electrode 113, and one second electrode tab 190 that is electrically connected to the second electrode 111.

Energy generated in the electrode assembly 100 is transferred to the outside through the first and second electrode tabs 170 and 190. Each of the first electrode tabs 170 and the second electrode tab 190 includes a conductive material, for example, nickel (Ni) or a nickel alloy. Although only one first electrode 113 may be provided, because the cap assembly 270 according to an embodiment may be more efficiently applied to a multi-tab structure including a plurality of first electrode tabs 170, it is assumed that the secondary battery 10 includes multi-tabs in the following description for convenience of explanation.

The can 200 has a cylindrical shape having one open end and a central space in which the electrode assembly 100 is received. The second electrode tab 190 may be welded to a bottom surface (e.g., an inner bottom surface) of the can 200, and thus, the can 200 may function as an electrode terminal.

The can 200 may be formed of, for example, stainless steel, aluminum, or an equivalent thereof, but the inventive concept is not limited thereto.

The plurality of insulating plates 230 and 240 includes a first insulating plate 240 that is provided on a portion of the electrode assembly 100 that faces an opening of the can 200, and a second insulating plate 230 that is provided on a portion of the electrode assembly 100 that faces a surface (e.g., the bottom surface or the inner bottom surface) of the can 200 that is opposite to the opening of the can 200. An undesired electrical short-circuit between the electrode assembly 100 and the can 200 may be prevented due to the first and second insulating plates 240 and 230.

The first insulating plate 240 may have a plurality of holes (e.g., first holes) 241 through which an electrolytic solution may be injected (e.g., smoothly injected) into the electrode assembly 100. The first insulating plate 240 may have a hole (e.g., a second hole) 243 through which the plurality of first electrode tabs 170 drawn from the electrode assembly 100 may pass.

The second insulating plate 230 may include a plurality of holes 231. Because the second insulating plate 230 includes the plurality of holes 231, a space occupied by the second insulating plate 230 in the can 220 may be minimized or reduced, and thus, a reduction in the injected electrolytic solution may be minimized or reduced.

The center pin 250 is provided at the center (or axial center) of the electrode assembly 100 to prevent or substantially prevent the electrode assembly 100 from becoming loose. The center pin 250 may have a circular rod shape in which a hollow portion is formed. One end of the center pin 250 may press downward on the second electrode tab 190, so that the second electrode tab 190 is closely attached to (e.g. contacts) the can 200.

Because the hollow portion is formed in the center pin 250, gas generated from the electrode assembly 100 may flow through the hollow portion. A hole (e.g., a center hole) 242 is formed at the center of the first insulating plate 240 to correspond to the center pin 250, and gas may be discharged through the hole 242.

A plurality of holes 251 may be formed at (e.g., in) a side (e.g., a side surface) of the center pin 250 in order to facilitate impregnation of the electrolytic solution, and to discharge gas generated from the electrode assembly 100.

A clamping portion 213, that may be curved inward, is formed along an edge of the opening of the can 200. The clamping portion 213 clamps the cap assembly 270 to increase a fastening force.

The can 200 includes a bead 210 that is curved inward between the opening and the electrode assembly 100 to be in a concave shape. An inner diameter of the bead 210 is less than an outer diameter of the electrode assembly 100, and thus, the electrode assembly 100 may be fixed to not move within the can 200.

The cap assembly 270 includes a cap plate 217 that may function as an electrode terminal, and a current interrupt device (CID) between the cap plate 217 and the electrode assembly 100. The CID includes a positive temperature coefficient element 272, a vent plate 273, an insulator 276, a middle plate 277, and a sub-plate 271, which may be sequentially stacked from the cap plate 217 toward the electrode assembly 100.

The positive temperature coefficient element 272 cuts off over-current.

A vent 275 is provided at the center of the vent plate 273. The vent 275 protrudes downward toward a through-hole 276A that is formed at the center of the insulator 276, and toward a through-hole (e.g., a center or first through-hole) 277A that is formed at the center of the middle plate 277. The vent 275 may contact the sub-plate 271 through the through-holes 276A and 277A.

The middle plate 277 includes one or more through-holes (e.g., side or second through-holes) 277B through which pressure is applied to the vent plate 273 when internal pressure of the secondary battery 10 is increased.

Also, the middle plate 277 may be electrically connected to the vent plate 273 through the sub-plate 271.

The sub-plate 271 is closely attached to (e.g., contacts) the middle plate 277 between the electrode assembly 100 and the middle plate 277, to overlap with (e.g., close) the through-hole 277A of the middle plate 277. The sub-plate 271 may be electrically connected to the vent 275 of the vent plate 273 by using a welding and/or the like.

The vent plate 273 and the middle plate 277 are insulated from each other due to the insulator 276 that is provided between the vent plate 273 and the middle plate 277.

Circular and cross-shaped grooves 274 are formed around the vent 275 of the vent plate 273. The vent 275 of the vent plate 273 moves toward the cap plate 217 when gas is generated in the secondary battery 10 and pressure is increased. As the vent plate 273 is deformed in this manner, the sub-plate 271 and the vent 275 are separated from each other as a contact (or bonding) area therebetween is broken, and/or as a part of the sub-plate 271 is broken, thereby interrupting the flow of current. When pressure of the secondary battery 10 is increased (e.g., continuously increased), the grooves 274 may be fractured, and gas may be discharged to the outside.

The gasket 260 seals a space between the opening of the can 200 and the cap assembly 270. The gasket 260 surrounds an outer circumferential surface of the cap assembly 270, and insulates at least some of the parts of the cap assembly 270 (e.g., the cap plate 217, etc.) from the can 200. The gasket 260 may be formed of an insulating elastic material.

The plurality of first electrode tabs 170 are drawn from (e.g., extended from or connected to) a plurality of portions (e.g., first electrodes 113) of the electrode assembly 100 of the secondary battery 10, and are electrically connected to each other. Any one of the plurality of first electrode tabs 170 is electrically connected to the sub-plate 271 and/or the middle plate 277. In this case, a method such as, for example, welding may be used. Accordingly, a current path from the electrode assembly 100 to the cap plate 217 that is an uppermost end is formed.

In this case, because the middle plate 277 according to an embodiment includes a receiving groove 277C (e.g., see FIGS. 4 through 6) in which the sub-plate 271 is received, a height increment due to a thickness of the sub-plate 271, which may occur in a CID structure in which the sub-plate 271 is located under the middle plate 277, is reduced or eliminated. Accordingly, as described below, the secondary battery 10 having a cylindrical shape and a limited available volume may have high capacity and high output power, and welding defects between the cap assembly 270 and the first electrode tabs 170 of the electrode assembly 100 may be reduced.

Aspects and features of the inventive concept will now be explained in more detail with reference to FIGS. 4 through 7, along with FIGS. 1 through 3.

Figure 4:
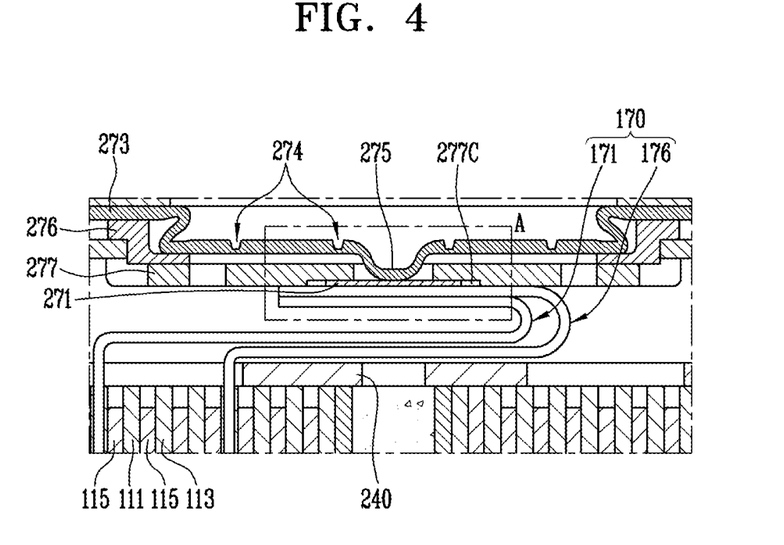
FIG. 4 is a partial enlarged view of FIG. 3 illustrating a connection relationship between a cap assembly and a plurality of first electrode tabs according to an embodiment.

FIG. 4 is a partial enlarged view of FIG. 3 illustrating a connection relationship between the cap assembly 270 and the plurality of first electrode tabs 170 according to an embodiment.

Figure 5A:
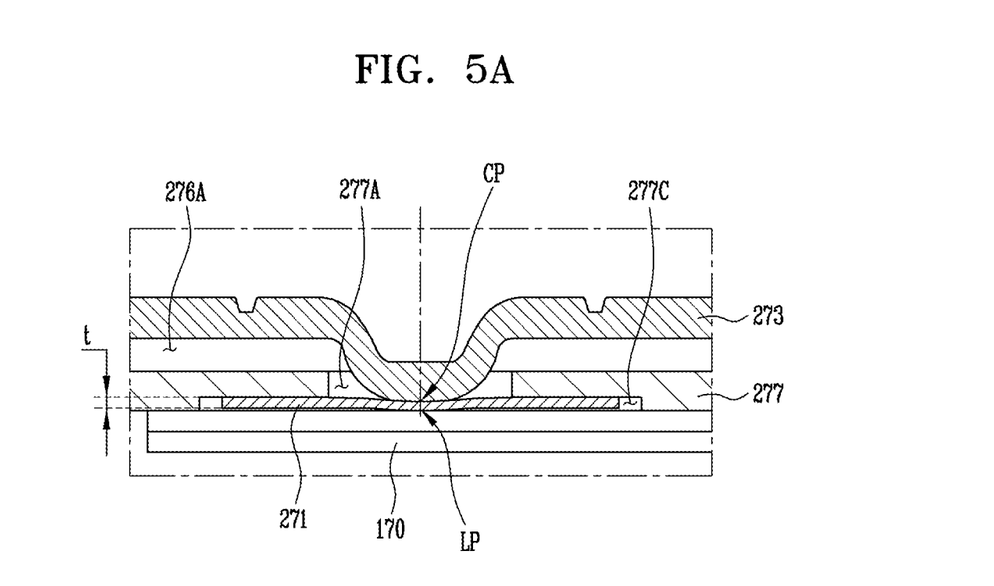
FIG. 5A is an enlarged view illustrating the portion A of FIG. 4.
Figure 5B:
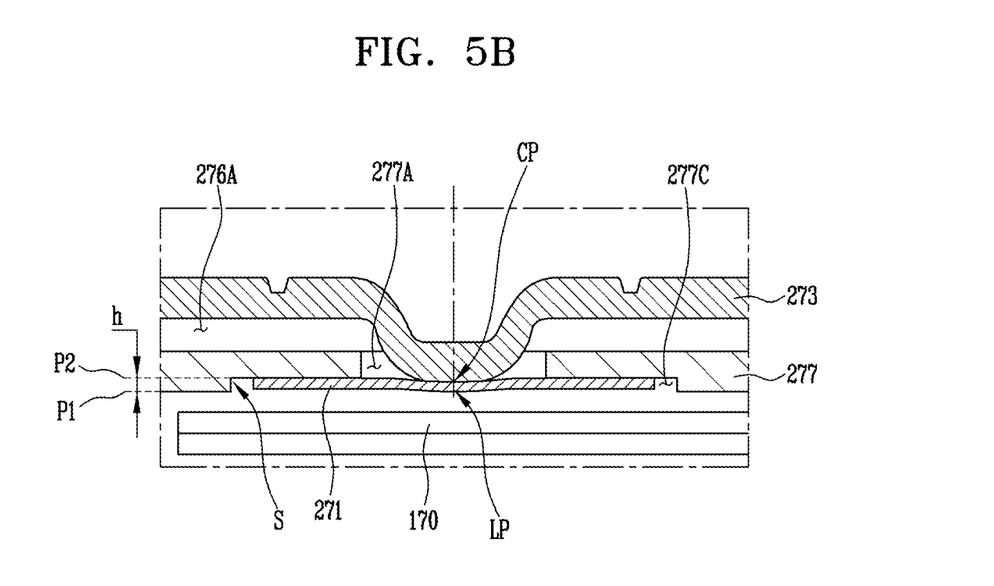
FIG. 5B is a view illustrating a state where the plurality of first electrode tabs are separated from the cap assembly of FIG. 5A for convenience of explanation.

FIG. 5A is an enlarged view illustrating the portion A of FIG. 4. FIG. 5B is a view illustrating a state where the plurality of first electrode tabs 170 are separated from the cap assembly 270 of FIG. 5A for convenience of explanation.

Figure 6:
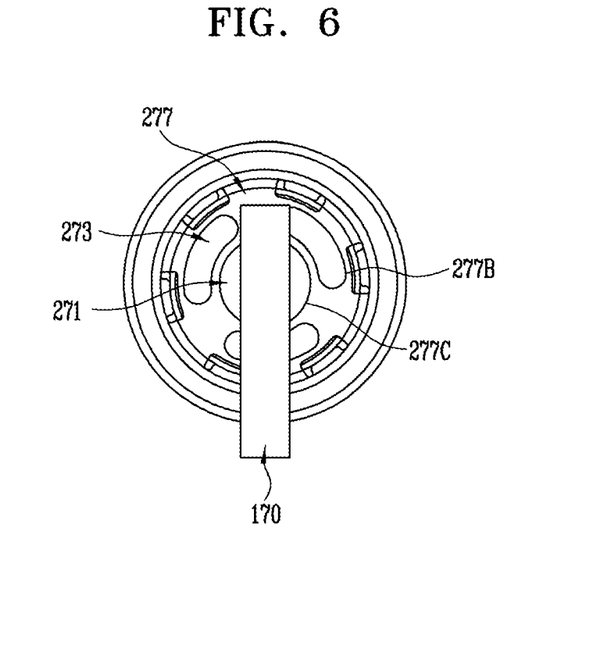
FIG. 6 is a bottom view of the cap assembly to which the plurality of first electrode tabs are connected according to an embodiment.

Also, FIG. 6 is a bottom view of the cap assembly 270 to which the plurality of first electrode tabs 170 are connected according to an embodiment.

Referring to FIGS. 3 and 4, the cap assembly 270 includes the vent plate 273, the sub-plate 271, the middle plate 277, and the insulator 276. The vent plate 273 is located under the cap plate 217. The vent plate 273 includes the vent 275, and may be deformed when internal pressure of the secondary battery 10 is increased. The sub-plate 271 is located under the vent plate 273, is coupled to (e.g., adhered to or contacts) the vent 275, and is a part of a CID along with the vent plate 273. The middle plate 277 is located between the vent plate 273 and the sub-plate 271, and is electrically connected to the vent plate 273 through the sub-plate 271. The insulator 276 is located between the vent plate 273 and the middle plate 277.

The plurality of first electrode tabs 170 include an inner tab 171 and an outer tab 176. The inner tab 171 is located closer to a central axis of the electrode assembly 100 than the outer tab 176. In this case, the inner tab 171 and the outer tab 176 are aligned at a same side of the central axis of the electrode assembly 100, so that portions of the inner tab 171 and the outer tab 176 that extend outward from the electrode assembly 100 overlap with each other.

The plurality of first electrode tabs 170 that are aligned with each other are connected to the cap assembly 270, and are connected (e.g., adhered) to both the sub-plate 271 and the middle plate 277, in order to minimize or reduce an internal resistance of the secondary battery 10. That is, the plurality of first electrode tabs 170 extending (e.g., drawn) from the electrode assembly 100 are located under the sub-plate 271 and the middle plate 277, and are connected (e.g., adhered) to both the sub-plate 271 and the middle plate 277. Accordingly, the electrode assembly 100 is electrically connected to the vent plate 273.

In this case, the middle plate 277 according to an embodiment includes the receiving groove 277C for receiving the sub-plate 271.

In more detail, referring to FIGS. 5A and 5B, the receiving groove 277C of the middle plate 277 may have a concave shape extending upwards from a bottom surface of the middle plate 277.

The receiving groove 277C may have a size corresponding to a size of the sub-plate 271 in order to receive the sub-plate 271. However, for convenience of explanation, a size of the receiving groove 277C is slightly exaggerated and is shown as being greater than that of the sub-plate 271, but the inventive concept is not limited thereto.

In more detail, a height 'h' of the receiving groove 277C is equal to or greater than a thickness 't' of the sub-plate 271, so that the sub-plate 271 located under the middle plate 277 may be received entirely within the receiving groove 277C of the middle plate 277.

In other words, the middle plate 277 may include a stepped portion S that extends from a bottom surface P1 of the middle plate 277 to a surface (e.g., a top surface or a horizontal surface) P2 of the receiving groove 277C, and a height 'h' of the stepped portion S may be equal to or greater than the thickness 't' of the sub-plate 271. Accordingly, the sub-plate 271 may be received entirely within the receiving groove 277C of the middle plate 277, and no portion of the sub-plate 271 may extend beyond the middle plate 277.

The sub-plate 271 is connected (e.g., closely attached) to the top surface P2 of the receiving groove 277C to close the through-hole 277A of the middle plate 277.

As such, because the bottom of the cap assembly 270 is entirely or substantially flat, as shown in FIG. 6, the plurality of first electrode tabs 170 that are located under the sub-plate 271 and the middle plate 277, and that are connected (e.g., adhered) to both the sub-plate 271 and the middle plate 277, may be more closely connected (e.g., attached) to the sub-plate 271 and the middle plate 277.

As an adhesive force increases, a contact area between the plurality of first electrode tabs 170 and the sub-plate 271 and the middle plate 277 may increase, and an internal resistance of the secondary battery 10 may decrease, thereby reducing welding defects between the plurality of first electrode tabs 170 and the sub-plate 271 and the middle plate 277.

Because the height 'h' of the receiving groove 277C may be greater than the thickness 't' of the sub-plate 271, the vent 275 may protrude into the receiving groove 277C through the through-hole 276A of the insulator 276 and through the through-hole 277A of the middle plate 277 by a length of a portion corresponding to the height 'h' of receiving groove 277C that is greater than the thickness 't' of the sub-plate 271. In this case, the vent 275 is connected (e.g., adhered) to the sub-plate 271 in the receiving groove 277C.

That is, the through-hole 276A of the insulator 276, the through-hole 277A of the middle plate 277, and the receiving groove 277C of the middle plate 277 may communicate (or be aligned) with each other, and the vent 275 is connected (e.g., adhered) to the sub-plate 271 through the through-hole 276A of the insulator 276, the through-hole 277A of the middle plate 277, and the receiving groove 277C of the middle plate 277.

Even in this case, because the sub-plate 271 is received entirely within the receiving groove 277C without extending beyond the middle plate 277, the plurality of first electrode tabs 170 may be closely connected (e.g., attached) to the sub-plate 271 and the middle plate 277 that forms a bottom surface of the cap assembly 270.

As described above, because the through-hole 276A of the insulator 276, the through-hole 277A of the middle plate 277, and the receiving groove 277C of the middle plate 277 communicate (or are aligned) with each other, the sub-plate 271 includes a contact portion CP that contacts the vent 275, and a bottom portion LP that is opposite to (e.g., faces away from) the contact portion CP, and at least one of the contact portion CP and the bottom portion LP is located within the receiving groove 277C of the middle plate 277.

Figure 7:
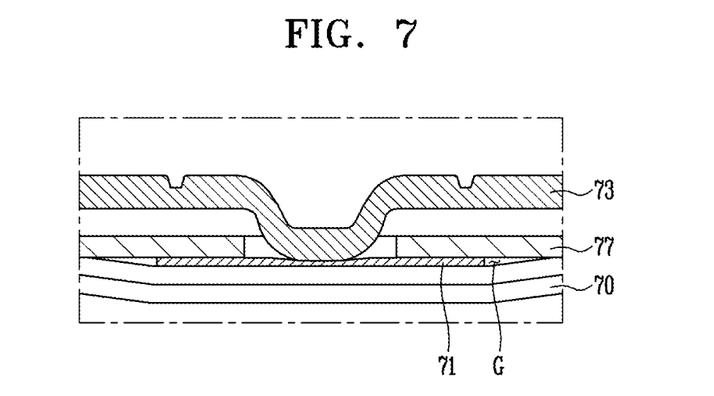
FIG. 7 is a partial cross-sectional view of a cap assembly according to a comparative example.

FIG. 7 is a partial cross-sectional view of a cap assembly according to a comparative example.

As shown in FIG. 7, when an electrode tab 70 is connected (e.g., adhered) to both a sub-plate 71 and a middle plate 77, a gap G may be formed between the middle plate 77 and the electrode tab 70 due to a thickness of the sub-plate 71. This is because a bent portion is formed due to the thickness of the sub-plate 71 in a process of connecting (e.g., closely attaching) the electrode tab 70 to both the sub-plate 71 and the middle plate 77 during welding.

Although a thickness of the gap G varies according to the type of secondary battery, the thickness of the gap G may range from about 0.13 mm to about 0.15 mm in the comparative cylindrical secondary battery shown in FIG. 7.

The gap G formed by the electrode tab 70, the sub-plate 71, and the middle plate 77 reduces a contact area between the electrode tab 70 and the sub-plate 71 and the middle plate 77, thereby making it difficult to reduce an internal resistance of the secondary battery.

However, in a cap assembly according to one or more embodiments of the present invention, because an electrode tab may be closely connected (e.g., attached) to a sub-plate and a middle plate, an internal resistance of a secondary battery may be reduced, and a cylindrical secondary battery having high capacity and high output power may be provided, even with a limited available volume. Also, welding defects between the electrode tab and the sub-plate and the middle plate may be reduced.

In particular, in a multi-tab structure used to increase output power of a secondary battery, because a plurality of electrode tabs are provided, the flexibility of the electrode tabs is reduced. In the structure shown in FIG. 7, it is difficult to closely attach the electrode tabs to a sub-plate and a middle plate (that is, a gap G formed between (e.g., defined by) the electrode tabs and the sub-plate and the middle plate may be further increased). In the cap assembly according to one or more embodiments, however, because a height increment due to a thickness of the sub-plate is eliminated or reduced by a receiving groove of the middle plate, the electrode tab may be closely connected (e.g., attached) to the sub-plate and the middle plate. Accordingly, a multi-tab structure may be used without a risk of increasing a resistance of the secondary battery, and welding defects between the cap assembly and the electrode tab may be reduced.

According to one or more embodiments of the inventive concept, a cap assembly having a novel structure that may reduce a resistance of a battery and/or increase output power may be provided.

According to one or more embodiments of the inventive concept, a multi-tab structure may be used without a risk of increasing a resistance of the battery.

According to one or more embodiments of the inventive concept, welding defects between the cap assembly and an electrode tab of an electrode assembly may be reduced.

While aspects and features of the inventive concept have been particularly shown and described with reference to the example embodiments, these examples are provided for the purpose of illustration, and it will be understood by one of ordinary skill in the art that various changes and modifications may be made thereto, all without departing from the spirit and scope of the inventive concept, as defined in the following claims and their equivalents.

What is claimed is:

1. A cap assembly of a secondary battery, the cap assembly comprising:
    a cap plate;
    a current interrupt device (CID) under the cap plate, the CID comprising:
        a vent plate under the cap plate, the vent plate comprising a vent protruding downward and configured to be deformed when internal pressure of the secondary battery is increased; and
        a sub-plate under the vent plate and connected to the vent;
    a middle plate between the vent plate and the sub-plate and electrically connected to the vent plate through the sub-plate, the middle plate having a receiving groove configured to accommodate the sub-plate therein; and
    an insulator between the vent plate and the middle plate, wherein the sub-plate is seated in the receiving groove of the middle plate.

2. The cap assembly of claim 1, wherein the receiving groove has a concave shape extending upward from a bottom surface of the middle plate.

3. The cap assembly of claim 2, wherein the middle plate comprises a stepped portion extending from the bottom surface of the middle plate to a surface of the receiving groove, and
    wherein a height of the stepped portion is equal to or greater than a thickness of the sub-plate.

4. The cap assembly of claim 3, wherein the sub-plate contacts the surface of the receiving groove.

5. The cap assembly of claim 1, wherein a height of the receiving groove is equal to or greater than a thickness of the sub-plate.

6. The cap assembly of claim 1, wherein each of the insulator and the middle plate has a through-hole, and
    wherein the vent passes through the through-hole of the insulator and the through-hole of the middle plate, and is connected to the sub-plate.

7. The cap assembly of claim 6, wherein the vent passes through the through-hole of the insulator, the through-hole of the middle plate, and the receiving groove of the middle plate, and is connected to the sub-plate.

8. The cap assembly of claim 2, wherein the sub-plate comprises a contact portion contacting the vent, and a bottom portion opposite to the contact portion, and
    wherein at least one of the contact portion and the bottom portion is in the receiving groove.

9. The cap assembly of claim 8, wherein an electrode tab extending from an electrode assembly of the secondary battery is under the sub-plate and the middle plate, and is connected to at least one of the sub-plate and the middle plate to electrically connect the electrode assembly to the vent plate.

10. The cap assembly of claim 9, wherein the electrode tab is connected to both the sub-plate and the middle plate.

11. The cap assembly of claim 9, wherein the electrode tab has a multi-tab structure comprising a plurality of tabs extending from a plurality of portions of the electrode assembly of the secondary battery, and the plurality of tabs are electrically connected to each other.

12. A secondary battery comprising a cap assembly, the cap assembly comprising:
    a cap plate;
    a current interrupt device (CID) under the cap plate, the CID comprising:
        a vent plate under the cap plate, the vent plate comprising a vent protruding downward and configured to be deformed when internal pressure of the secondary battery is increased; and
        a sub-plate under the vent plate and connected to the vent;
    a middle plate between the vent plate and the sub-plate and electrically connected to the vent plate through the sub-plate, the middle plate having a receiving groove configured to accommodate the sub-plate therein; and
    an insulator between the vent plate and the middle plate, wherein the sub-plate is seated in the receiving groove of the middle plate.

13. The secondary battery of claim 12, wherein the receiving groove has a concave shape extending upward from a bottom surface of the middle plate.

14. The secondary battery of claim 13, wherein the middle plate comprises a stepped portion extending from the bottom surface of the middle plate to a surface of the receiving groove, and
    wherein a height of the stepped portion is equal to or greater than a thickness of the sub-plate.

15. The secondary battery of claim 12, wherein a height of the receiving groove is equal to or greater than a thickness of the sub-plate.

16. The secondary battery of claim 12, wherein each of the insulator and the middle plate has a through-hole, and
   wherein the vent passes through the through-hole of the insulator and the through-hole of the middle plate, and is connected to the sub-plate.

17. The secondary battery of claim 12, wherein the sub-plate comprises a contact portion contacting the vent, and a bottom portion opposite to the contact portion, and
   wherein at least one of the contact portion and the bottom portion is in the receiving groove.

18. The secondary battery of claim 17, wherein an electrode tab extending from an electrode assembly of the secondary battery is under the sub-plate and the middle plate, and is connected to at least one of the sub-plate and the middle plate to electrically connect the electrode assembly to the vent plate.

19. The secondary battery of claim 18, wherein the electrode tab is connected to both the sub-plate and the middle plate.

20. The secondary battery of claim 18, wherein the electrode tab has a multi-tab structure comprising a plurality of tabs extending from a plurality of portions of the electrode assembly of the secondary battery, and the plurality of tabs are electrically connected to each other.

* * * * *